(12) United States Patent
Zięba et al.

(10) Patent No.: US 12,253,537 B2
(45) Date of Patent: Mar. 18, 2025

(54) METHOD OF MEASURING A MINIMUM PRESSURE FOR GAS BUBBLE GENERATION OF A CAPILLARY TUBE, AND RELATED METHODS

(71) Applicant: XTPL S.A., Wrocław (PL)

(72) Inventors: Szymon Zięba, Wrocław (PL); Maciej Tybel, Wrocław (PL); Piotr Kowalczewski, Łódź (PL); Filip Granek, Mrozów (PL)

(73) Assignee: XTPL S.A., Wroclaw (PL)

( * ) Notice: Subject to any disclaimer, the term of this patent is extended or adjusted under 35 U.S.C. 154(b) by 913 days.

(21) Appl. No.: 17/174,892

(22) Filed: Feb. 12, 2021

(65) Prior Publication Data
US 2021/0247284 A1    Aug. 12, 2021

Related U.S. Application Data

(60) Provisional application No. 62/975,667, filed on Feb. 12, 2020.

(51) Int. Cl.
*G01N 7/14* (2006.01)
*B01F 23/231* (2022.01)
(Continued)

(52) U.S. Cl.
CPC ......... *G01N 7/14* (2013.01); *B01F 23/23121* (2022.01); *B01F 2215/0431* (2013.01);
(Continued)

(58) Field of Classification Search
CPC .. G01N 7/14; G01N 13/02; G01N 2013/0241; B01F 23/23121;
(Continued)

(56) References Cited

U.S. PATENT DOCUMENTS 2,401,053 A  *  5/1946  Cupples ................. G01N 13/02
                                                              73/64.51
4,400,445 A  *  8/1983  Berkstresser ........... C30B 19/02
                                                              117/945
(Continued)

FOREIGN PATENT DOCUMENTS

CN       208432506 U  *  1/2019
DE       20318463 U1  *  4/2004  ............. G01N 13/02

*Primary Examiner* — Stephen Hobson
(74) *Attorney, Agent, or Firm* — K&L Gates LLP

(57) ABSTRACT

A method of measuring a minimum pressure for gas bubble generation (MPGBG) value of a capillary tube is disclosed. The capillary tube has an inlet and an output portion including an outlet. The inlet is connected to a regulated pneumatic system, configured to supply a gas to the inlet under pressure. The output portion is immersed in a liquid. The gas is supplied to the inlet under a range of pressures including a higher pressure range and a lower pressure range. In the higher pressure range, gas bubbles are generated in the liquid from the outlet. In the lower pressure range, no gas bubbles are generated in the liquid from the outlet. A value of the minimum pressure for gas bubble generation (MPGBG) for the liquid is determined.

Other methods include a method of measuring and storing MPGBG values of capillary tubes, methods of selecting at least one capillary tube from a plurality of capillary tubes, and a method of cutting a capillary tube to a desired MPGBG value.

8 Claims, 24 Drawing Sheets

(51) Int. Cl.
*B01L 3/00* (2006.01)
*G01N 13/02* (2006.01)

(52) U.S. Cl.
CPC . *B01L 3/502784* (2013.01); *B01L 2400/0487* (2013.01); *G01N 13/02* (2013.01); *G01N 2013/0241* (2013.01)

(58) Field of Classification Search
CPC ....... B01F 2215/0431; B01L 3/502784; B01L 2400/0487; B01L 3/022; G05D 16/2013
See application file for complete search history.

(56) References Cited

U.S. PATENT DOCUMENTS

| | | | | |
|---|---|---|---|---|
| 6,168,267 | B1* | 1/2001 | Komplin | B41J 2/17503 347/86 |
| 7,975,531 | B2* | 7/2011 | Nguyen | G01N 13/02 73/64.48 |
| 8,828,335 | B2* | 9/2014 | Prakash | F16L 55/00 422/68.1 |
| 2006/0284325 | A1* | 12/2006 | Kohama | B01F 23/23123 261/DIG. 26 |
| 2007/0277597 | A1* | 12/2007 | Schumann | G01N 13/02 134/113 |
| 2008/0105622 | A1* | 5/2008 | Moran | B01D 17/0208 427/430.1 |
| 2010/0058839 | A1* | 3/2010 | Maggi | G01N 11/06 73/54.07 |
| 2010/0236990 | A1* | 9/2010 | Gleeson | C10G 31/06 208/177 |
| 2013/0342604 | A1* | 12/2013 | Yamashita | C09D 11/38 106/31.89 |
| 2014/0134509 | A1* | 5/2014 | Mizuhata | H01M 8/04186 429/432 |
| 2016/0049674 | A1* | 2/2016 | Yoshie | H01M 8/1004 429/456 |
| 2019/0001295 | A1* | 1/2019 | Ledwon | B01J 19/087 |
| 2019/0009544 | A1* | 1/2019 | Nakagawa | C09D 11/102 |
| 2023/0264262 | A1* | 8/2023 | Rusek | B22F 10/10 |

* cited by examiner

US 12,253,537 B2

METHOD OF MEASURING A MINIMUM PRESSURE FOR GAS BUBBLE GENERATION OF A CAPILLARY TUBE, AND RELATED METHODS

CROSS-REFERENCE TO RELATED APPLICATIONS

The present application claims priority under 35 U.S.C. § 119(e) to U.S. Provisional Patent Application Ser. No. 62/975,667, titled METHOD OF MEASURING A MINIMUM PRESSURE FOR GAS BUBBLE GENERATION OF A CAPILLARY TRUBE, AND RELATED METHODS, filed Feb. 12, 2020, the disclosure of which is herein incorporated by reference in its entirety.

BACKGROUND

Recent progress in nanoparticle compositions and fluid printing apparatuses have enabled dispensing conductive nanoparticle features having line widths in a range of about 1 μm to 20 μm. A fluid printing apparatus includes a nozzle and the nanoparticle feature is formed by dispensing a nanoparticle composition from the nozzle onto the substrate. Capillary tubes can be used as a nozzle. Line width control is achieved in part selecting the opening size (output diameter) at the outlet of a capillary tube. However, in many of these applications, the output diameter is too small to be measured under an optical microscope. Therefore, more efficient methods of estimating the output diameter and other related quantities are desired.

SUMMARY OF THE INVENTION

In one aspect, a method of measuring a minimum pressure for gas bubble generation (MPGBG) value of a capillary tube is disclosed. The method includes the following: connecting an inlet of the capillary tube to a regulated pneumatic system, configured to supply a gas to the inlet under pressure; immersing at least an output portion of the capillary tube in a liquid; supplying the gas to the inlet under a range of pressures, including a higher pressure range and a lower pressure range; and determining a value of a minimum pressure for gas bubble generation (MPGBG) of the capillary tube. In the higher pressure range, gas bubbles are generated in the liquid from the outlet. In the lower pressure range, no gas bubbles are generated in the liquid from the outlet.

In yet another aspect, a method of measuring and storing minimum pressure for gas bubble generation (MPGBG) values of capillary tubes in a test group is disclosed. The method includes the following: for each of the capillary tubes in the test group, assigning an identifier to the respective capillary tube; measuring the MPGBG value; and storing the respective MPGBG value and the respective identifier in a data store.

In yet another aspect, a method of obtaining a numerical model is disclosed. The numerical model correlates estimated capillary tube output diameter values to minimum pressure for gas bubble generation (MPGBG) values. The method includes the following: an MPGBG value of each capillary tube in the reference group is measured for a liquid; an output diameter of each of the capillary tubes is measured by a microscope apparatus; and a numerical model that correlates estimated capillary tube output diameter values to MPGBG values for the liquid is calculated.

In yet another aspect, a method of estimating an output diameter value of a capillary tube is disclosed. The method includes measuring the MPGBG value of the capillary tube in a liquid; and inputting the measured MPGBG value into a numerical model to estimate the capillary tube output diameter value.

In yet another aspect, a method of estimating and storing output diameter values of capillary tubes in a test group is disclosed. The method includes the following: for each of the capillary tubes in the test group, assigning an identifier to the respective capillary tube; measuring the respective MPGBG value; inputting the respective MPGBG value into a numerical model to estimate the respective capillary tube output diameter value; and storing the respective capillary tube output diameter value and the respective identifier in a data store.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION OF ILLUSTRATIVE EMBODIMENTS

Applicant of the present application owns the following U.S. patent applications:

U.S. Provisional Patent Application Ser. No. 62/957,673, entitled METHOD OF ESTIMATING AN OUTPUT DIAMETER OF A CAPILLARY TUBE, AND RELATED METHODS, filed Feb. 12, 2020, the disclosure of which is herein incorporated by reference in its entirety; and U.S. Non-Provisional patent application Ser. No. 17/174,912, entitled METHOD OF ESTIMATING AN OUTPUT DIAMETER OF A CAPILLARY TUBE, AND RELATED METHODS, filed Feb. 12, 2021, now U.S. Pat. No. 11,691,110, the disclosure of which is herein incorporated by reference in its entirety.

The present disclosure relates to a method of measuring minimum pressure for gas bubble generation (MPGBG) value of a capillary tube and related methods.

In this disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. And, as appropriate, any combination of two or more steps may be conducted simultaneously.

Figure 1:
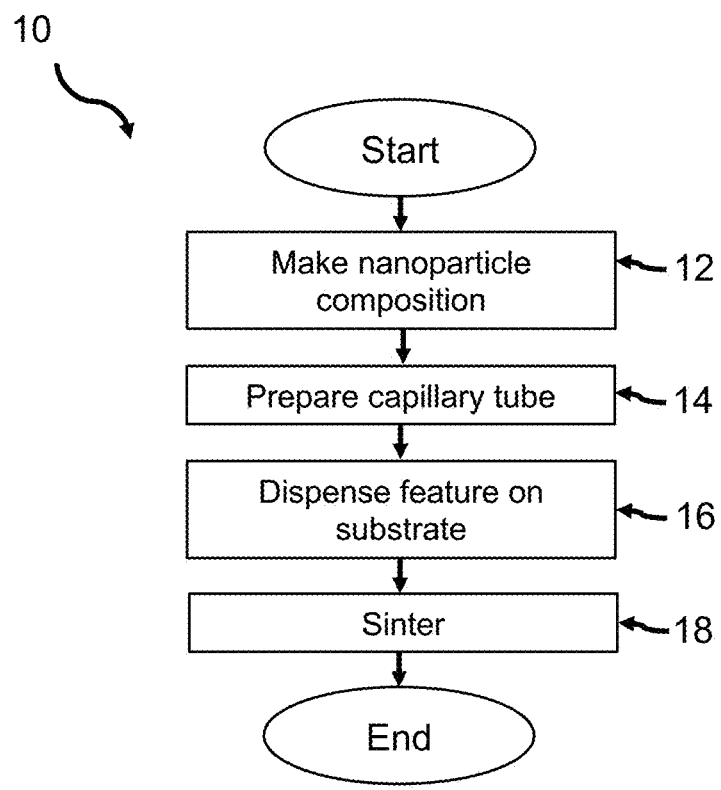
FIG. 1 is a flow diagram of a process of forming a conductive feature on a substrate.

FIG. 1 is a flow diagram of a process 10 of forming a conductive feature on a substrate. Metallic nanoparticles can be used to form the conductive features. Among various metallic nanoparticles, silver nanoparticles and copper nanoparticles are important because of the high electrical conductivity of silver and copper. For example, we have evaluated silver nanoparticles having an average particle size (diameter) in a range of 20 nm to 80 nm, and copper nanoparticles having an average particle size (diameter) in a range of 50 nm to 225 nm. Because of the lower cost of copper compared to silver, it may be preferable to use copper nanoparticles for achieving greater line widths (wider lines).

At step 12, a nanoparticle composition is made. This may include the synthesis of metallic nanoparticles in solution. During the synthesis, it is preferable to control the average nanoparticle size and dispersity. For example, we have developed methods of controlling the average size of the silver nanoparticles to within a range of 20 nm to 80 nm. At step 12, a metallic nanoparticle composition is made from the metallic nanoparticles for example. Generally, the nanoparticles are separated, to remove impurities, and dispersed in a solvent or solvent mixture. The metallic nanoparticle composition may optionally include additives to better control its physicochemical properties. These additives include surfactants, binders, adhesion promoters, and antifoaming agents.

At step 14, a capillary tube is prepared for use as a nozzle in a fluid printing apparatus. It has been found that a line width of a nanoparticle feature dispensed on a substrate depends in part on an opening diameter of an outlet of the capillary tube. We have found that some capillary tubes suitable for use as nozzles have output diameters of 1 μm or less. It is relatively difficult to measure the output diameters using an optical microscope. It is possible to measure the output diameter using a scanning electron microscope (SEM), but this is time-consuming. Therefore, this step of preparing a capillary tube for use may include estimating output diameter values of candidate capillary tubes without actually measuring the respective output diameter values in an SEM, as described in detail hereinbelow.

At step 16, the capillary tube is installed in the printing apparatus and the metallic nanoparticle composition is dispensed on a substrate using the fluid printing apparatus. An illustrative printing apparatus is described with reference to FIG. 2. At step 18, the work piece, i.e., the substrate with the dispensed feature thereon, is sintered. For example, the work piece can be sintered in a convection oven at a temperature in a range 300° C. to 500° C. for a period of 5 minutes to 90 minutes. Alternatively, photonic sintering, such as by using a laser or a flash lamp, can be used. Sintering is important for bringing out high electrical conductivity in the resulting conductive features.

Figure 2:
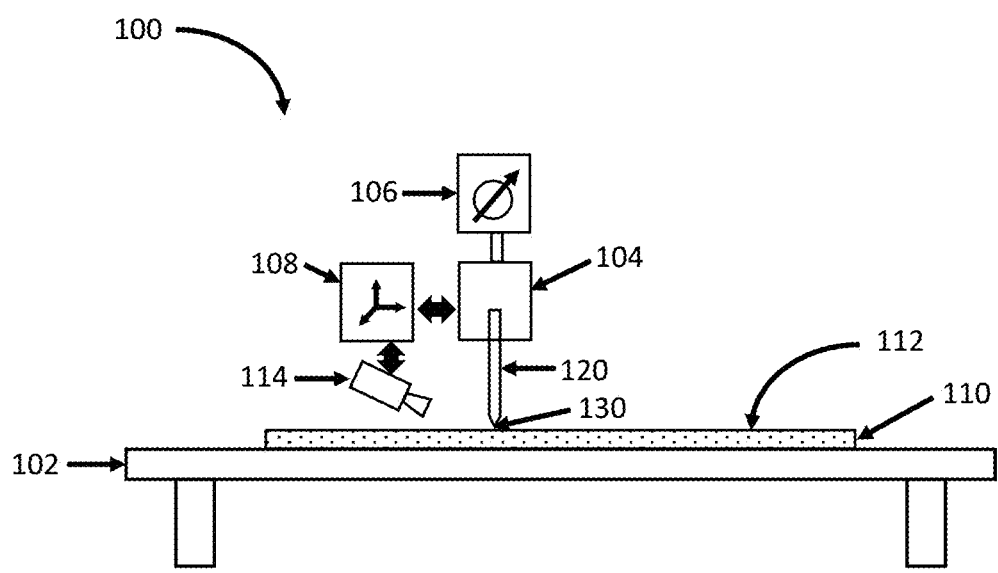
FIG. 2 is a block diagram view of an illustrative printing apparatus.

An illustrative fluid printing apparatus is shown in block diagram view in FIG. 2. The fluid printing apparatus 100 includes a substrate stage 102, a print head 104, a pneumatic system 106, and a print head positioning system 108. A substrate 110 is fixed in position on the substrate stage 102 during the printing (dispensing) and has a printable surface 112, which is facing upward and facing towards the print head 104. The print head 104 is positioned above the substrate 110. The print head includes a capillary tube (nozzle) 120, and the capillary tube (nozzle) 120 includes a tapering portion (output portion) 130. There is also an imaging system 114, configured to capture images of the nanoparticle composition being dispensed from the capillary tube 120 onto the printable surface 112.

The substrate 110 can be of any suitable material, such as glass or silicon. A flexible substrate can also be used. Furthermore, the substrate can have existing metal lines, circuitry, or other deposited materials thereon. For example, a fluid printing apparatus can be configured as an open defect repair apparatus, which can print lines in an area where there is an open defect in the existing circuit. In such case, the substrate can be a thin-film transistor array substrate for a liquid crystal display (LCD).

Figure 3:
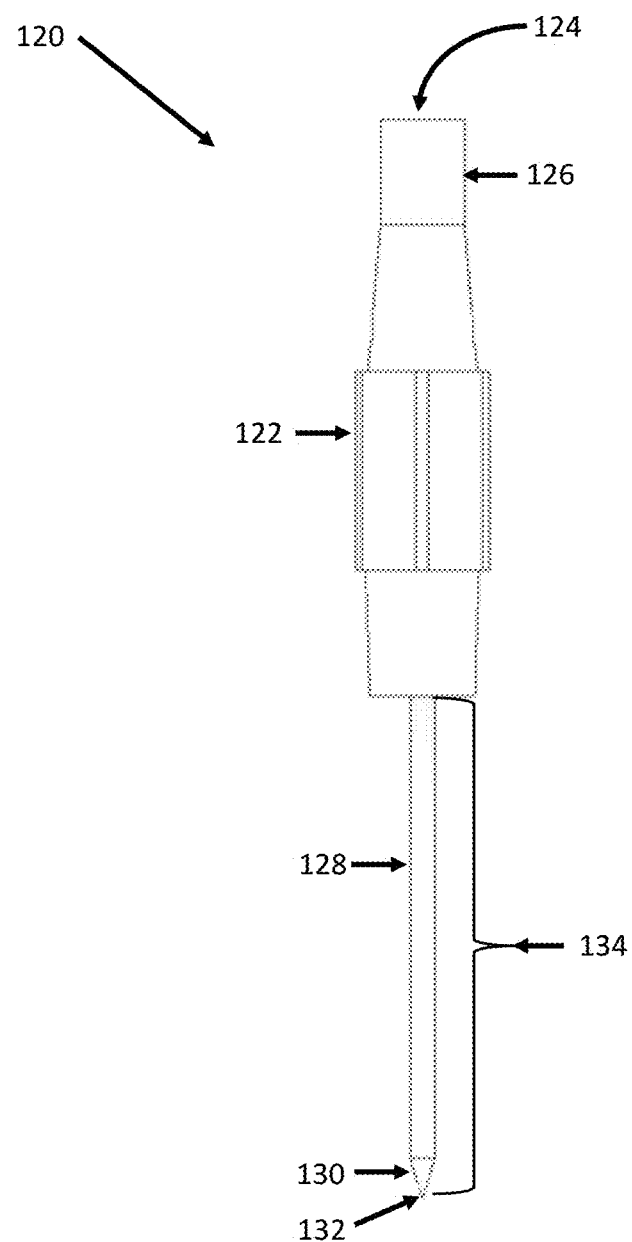
FIG. 3 is a schematic side view of a glass capillary tube.

The print head 104 includes a nozzle. Commercially available glass capillary tubes can be used as a nozzle. For example, glass capillary tubes called Eppendorfr™ Femtotips™ II Microinjection Capillary Tips, having an inner diameter at the tip of 0.5 μm and an outer diameter at the tip (outlet) of 0.7 are available from Fisher Scientific. The nominal inner diameter at the outlet is 0.5 μm with a variation of ±0.2 μm. A commercially available glass capillary tube 120 is shown schematically in FIG. 3. The glass capillary tube has an inlet 124, and outlet 132, and an elongate fluid passageway (glass capillary tube 120) between the inlet 124 and outlet 132. A plastic handle 122 is attached to the glass capillary tube 120 around its circumference. The plastic handle 122 includes an inlet (input end) 124 and a threaded portion 126 near the inlet 124 which enables a threaded connection to an external body or external conduit (not shown in FIG. 3). The inlet 124 has an inner diameter of 1.2 mm.

Figures 4, 5:
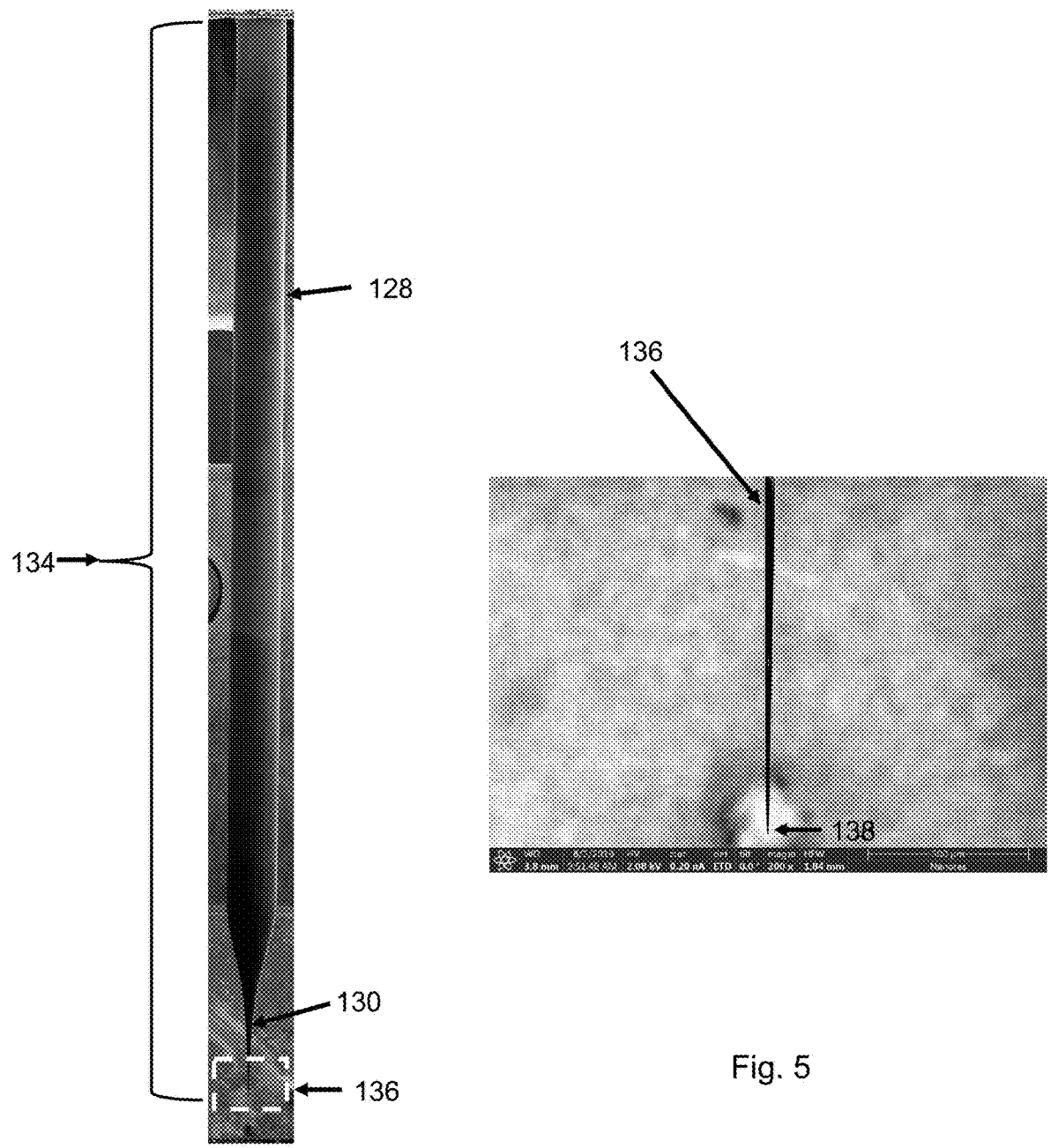
FIG. 4 is a scanning electron microscope (SEM) view of a portion of a glass capillary tube.
FIG. 5 is a scanning electron microscope (SEM) view of a tapering portion of the glass capillary tube, under low magnification.
Figure 6:
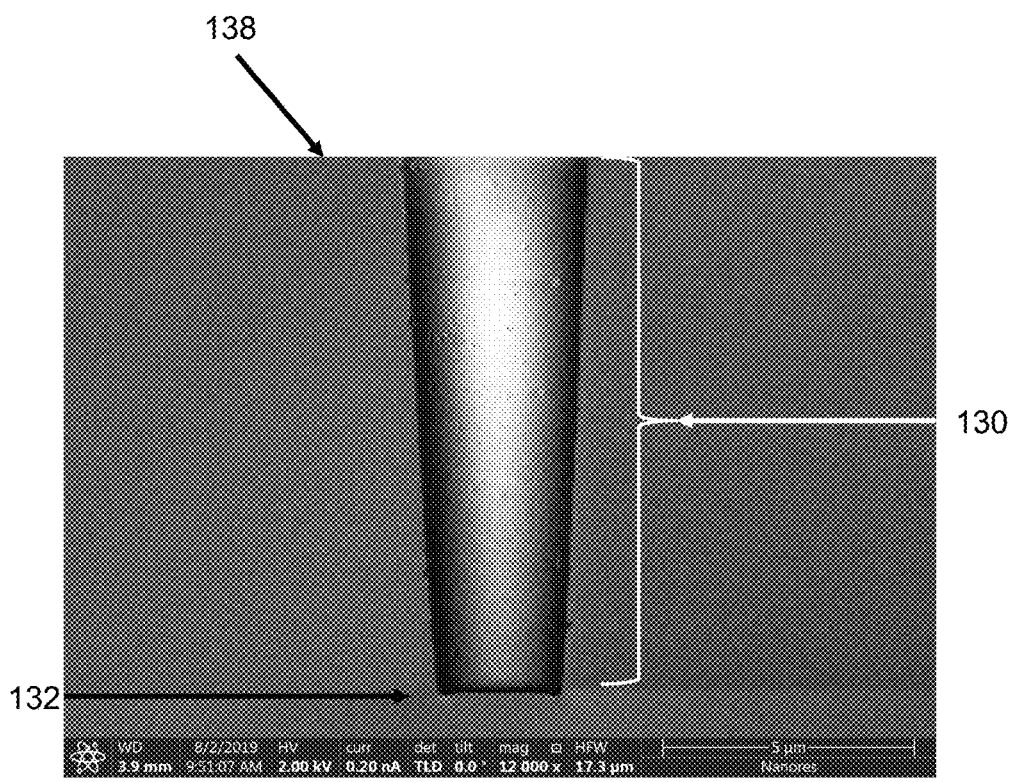
FIG. 6 is a scanning electron microscope (SEM) view of a tapering portion of the glass capillary tube, under high magnification.

The glass capillary tube includes an elongate input portion 128 and a tapering output portion 130. There is an externally visible portion 134 of the glass capillary tube 120. In the example shown, some of the elongate input portion 128 is obscured by the surrounding plastic handle 122. The tapering output portion 130 tapers to an outlet (output end) 132 (having an inner diameter of 0.5 μm and an outer diameter of 0.7 μm at the outlet in the case of the certain Femtotips™ II Microinjection Capillary Tips). The reduction of diameter along the tapering output portion 130 from the elongate input portion 128 to the outlet 132 is more clearly illustrated in FIGS. 4 through 6. FIG. 4 is a scanning electron micrograph view (formed from stitching together multiple SEM images) of the entire externally visible portion 134 of the glass capillary tube 120. A first magnification region 136 of the tapering output portion 130 including the outlet 132, observed under low magnification in a scanning electron microscope (SEM), is shown in FIG. 5. Furthermore, a second magnification region 138 located within the first magnification region 136, observed under high magnification in a scanning electron microscope (SEM), is shown in FIG. 6. The diameter is smallest at the outlet 132 (FIG. 6) and increases with increasing longitudinal distance from the outlet 132.

Figure 7:
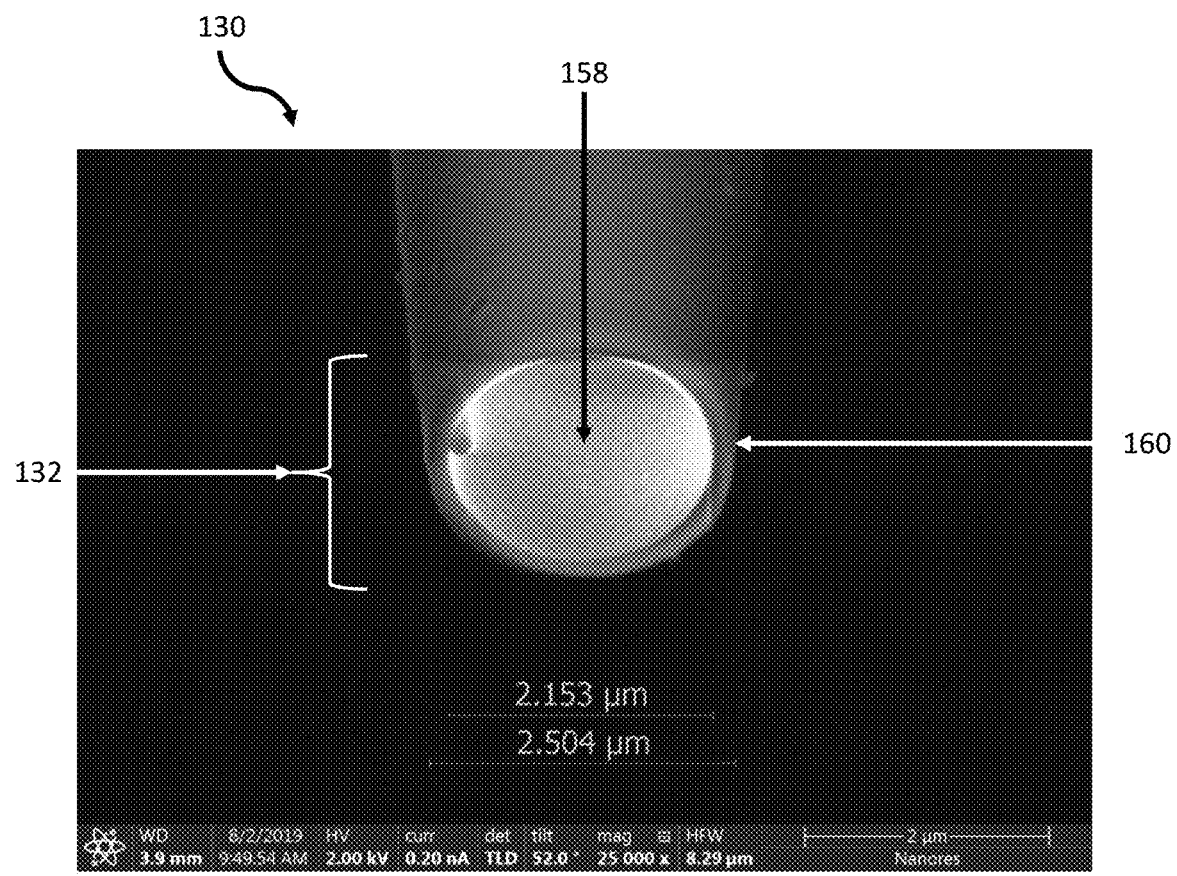
FIG. 7 is a scanning electron microscope (SEM) view of an outlet of a glass capillary tube.

It is possible to increase the outlet size by cutting the glass capillary tube 120 at a suitable longitudinal location along the tapering output portion 130. One method of cutting the glass capillary tube includes using a focused-ion beam apparatus. In this case, the glass capillary tube is installed in a focused-ion beam (FIB) apparatus. For example, a plasma-source Xe⁺ FIB (also called PFIB) is used. A longitudinal location along the tapering output portion 130 is selected, and the focused ion beam is directed to it, with sufficient energy density for cutting the glass tube. A cut is made using the focused-ion beam across the tapering portion at the selected longitudinal location. After the cutting is completed, a scanning electron microscope (in the FIB apparatus) is used to measure the outer diameter or inner diameter or both at the tip. As shown in FIG. 7, the cutting (or final iteration of cutting if multiple cuts are made) defines a (finalized) outlet 132 including the exit orifice 158 and the end face 160. In the example shown in FIG. 7, the outlet inner diameter is measured to be 2.153 μm and the outlet outer diameter is measured to be 2.504 μm. We refer to the outlet inner diameter as the outlet size or output diameter, but in certain cases the output diameter could be the outlet outer diameter.

It is also possible to cut the glass capillary tube by abrading the output portion against an abrasive material immersed in a liquid. For glass capillary tubes, we have found that indium tin oxide (ITO) coated glass substrates can be used as an abrasive material for abrading the output portions. Other abrasive materials can also be used. For glass capillary tubes 120, we have cut glass capillary tubes to outlet diameters up to 8 μm by the FIB method and the abrading method. Therefore, in the case of Femtotips™ II Microinjection Capillary Tips, the output diameters typically range between 0.3 μm and 0.7 μm, and after in-house cutting processes can range between 0.3 μm and 8 μm. Efficient methods of estimating the output diameter values of these capillary tubes are desired.

Figure 8:
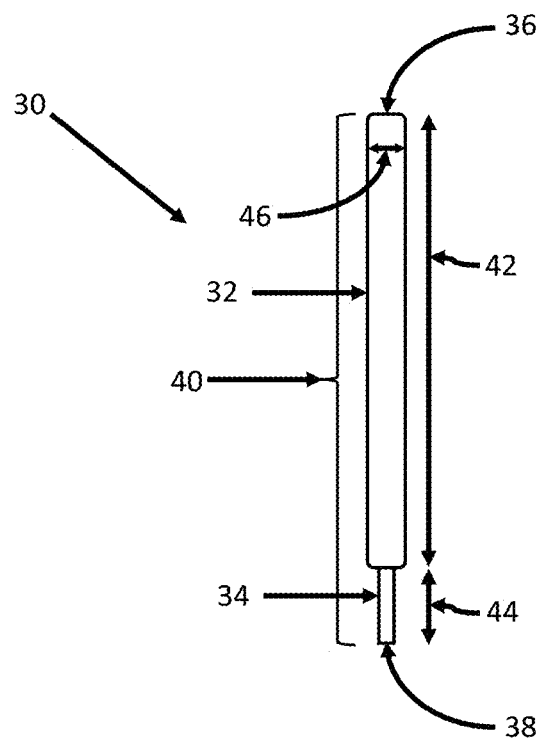
FIG. 8 is a schematic side view of a stainless steel capillary tube.
Figure 9:
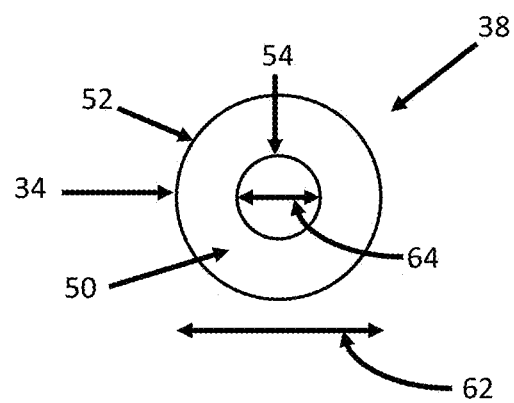
FIG. 9 is a schematic view of an outlet of the stainless steel capillary tube.

Commercially available stainless steel capillary tubes can be used as nozzles. For example, stainless steel needles (capillary tubes) called NanoFil™ Needles, are available from World Precision Instruments. Needle part numbers NF35BL-2 and NF36BL-2 have been used. A side view of stainless steel capillary tube 30 is shown schematically in FIG. 8. Needle (capillary tube) 30 has an inlet 36, which is attached to a syringe during operation, an outlet 38, and an elongate fluid passageway portion 40 between the inlet 36 and outlet 38. The fluid passageway portion 40 includes a shank portion 32, which includes the inlet 36, and an output portion 34, which includes the outlet 38. A length 42 of the shank portion is 30 mm and an outer diameter 46 of the shank portion is 460 μm. A length 44 of the output portion is 5 mm (for NF35BL-2) or 3 mm (for NF36BL-2). FIG. 9 is a bottom schematic view of the tip portion (output portion) 34, showing outlet 38 in greater detail. The needle tip portion (output portion) 34 has an outer wall 52, characterized by an outer diameter 62, and an inner wall 54, characterized by an inner diameter 64. The outer diameter 62 is 135 μm (for NF35BL-2) or 120 μm (for NF36BL-2). The inner diameter 64 is 55 μm (for NF35BL-2) or 35 μm (for NF36BL-2). We are referring to the inner diameter as the output diameter. Other stainless steel capillary tubes are also available. Many commercially available stainless steel capillary tubes have outlet inner diameters of approximately 30 μm or greater. For these larger diameter capillary tubes, it is possible to measure output diameters using an optical microscope. Nevertheless, the methods of the present invention are effective for estimating the output diameter values without actually measuring the output diameter using a microscope apparatus.

Figure 10:
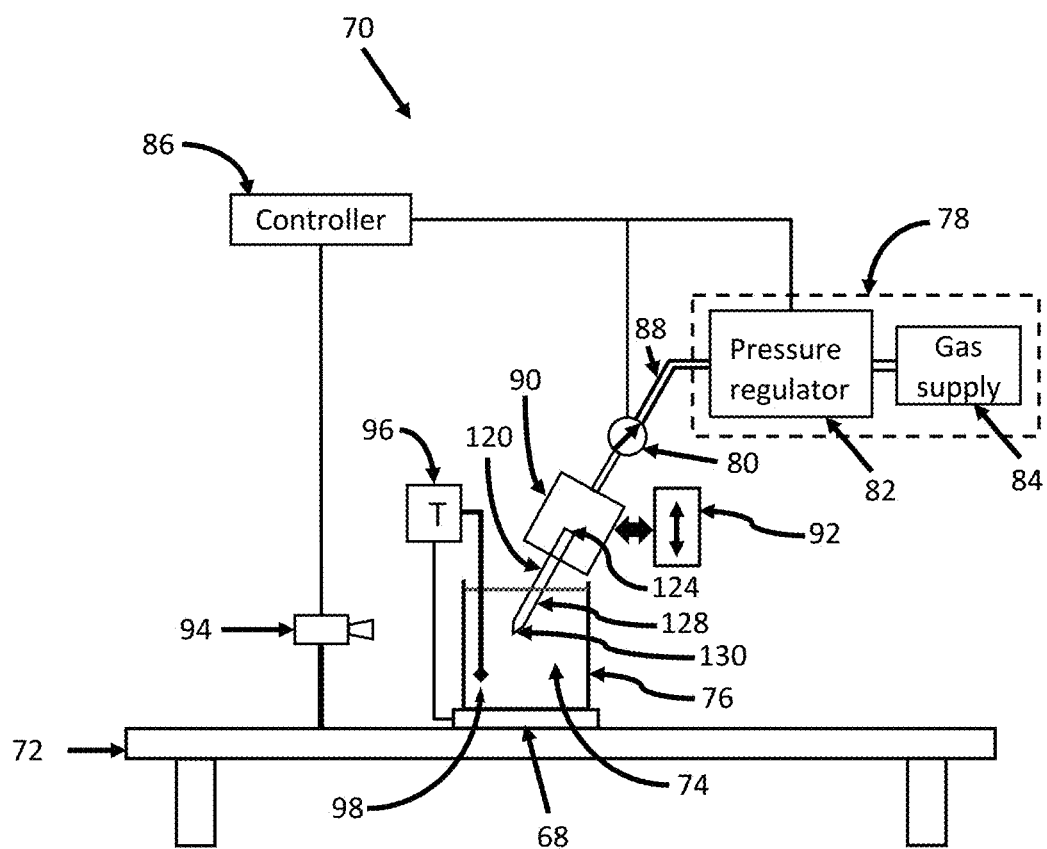
FIG. 10 is a schematic view of an illustrative apparatus for measuring a minimum pressure for gas bubble generation (MPGBG) value of a capillary tube.

An illustrative measurement apparatus according to the present invention is shown in schematic view in FIG. 10. The measurement apparatus 70 includes a substrate stage 72, a liquid container 76 containing a liquid 74, an imaging system 94, a temperature sensor assembly 96, a capillary tube holder 90 supporting a capillary tube 120, a vertical positioner 92, a pressure sensor 80, a regulated pneumatic system 78, and a controller 86. At least an output portion 130 of the capillary tube 120 is immersed in the liquid. In the example shown, some of the elongate input portion 128 is also immersed in the liquid. The capillary tube holder 90 is attached to or otherwise mechanically coupled to the vertical positioner 92. Accordingly, the vertical positioner 92 controls the vertical position of the capillary tube 120.

The liquid 74 can be a liquid that is used as a solvent in nanoparticle compositions that are dispensed from the capillary tubes. In addition, other liquids can also be used. We have been able to use propylene glycol, ethylene glycol, diethylene glycol monobutyl ether, 2-methoxyethanol, silicone oil, purified water, and glycerol as liquid 74. There is a large variation in viscosity among these liquids (e.g., viscosity of water is 1 cP at 20° C., viscosity of propylene glycol is 48.6 cP at 25° C., and viscosity of glycerol is 1408 cP at 20° C.). It was found that the minimum pressure for gas bubble generation (MPGBG) depends on the liquid 74 and the temperature of the liquid 74. Therefore, it is thought likely that factors such as viscosity and density have an effect on the MPGBG value. In the example shown, the capillary tube 120 is a glass capillary tube. However, other capillary tubes can also be used including stainless steel capillary tubes and plastic capillary tubes. When conducting MPGBG measurements on capillary tubes having outlet inner diameters of 30 μm or greater, it is preferable to use a highly viscous liquid such as glycerol (viscosity ~$10^3$ cP around room temperature).

The temperature sensor assembly 96 includes a temperature probe 98 immersed in the liquid 74. The temperature sensor assembly 96 continuously monitors the temperature of the liquid 74 during measurements. Preferably, the temperature of the liquid is within a predetermined temperature range, such as a range (difference between a maximum temperature and a minimum temperature) of 4° C., 3° C., 2° C., or 1° C. If the volume of the liquid is sufficiently large and the ambient temperature (e.g., room temperature) is maintained within a narrow temperature range, the temperature of the liquid may stay within a predetermined range. Alternatively, it may be preferable to continuously monitor the temperature of the liquid 74 and adjust the temperature of the liquid in accordance with the measured liquid temperature. In the example shown, the liquid container 76 is positioned on a thermal plate 68 (e.g., hot/cold plate) on the substrate stage 72. The thermal plate 68 is coupled to the temperature sensor assembly 96. In this case, the temperature sensor assembly is configured to adjust the temperature settings of the thermal plate 68 in accordance with the measured liquid temperatures and the predetermined temperature range.

The regulated pneumatic system 78 includes a gas supply 84 (e.g., a compressed gas cylinder) and a pressure regulator 82 that controls the pressure of the gas supplied by the gas supply 84. For example, the gas can be nitrogen, carbon dioxide, or any of the noble gases. The inlet 124 of the capillary tube 120 is connected to the regulated pneumatic system 78 via a gas passageway 88 and capillary tube holder 90. Also shown in FIG. 10 is an optional pressure sensor 80 installed along the gas passageway 88, to monitor the pressure of the gas supplied to the inlet 124.

Figure 11:
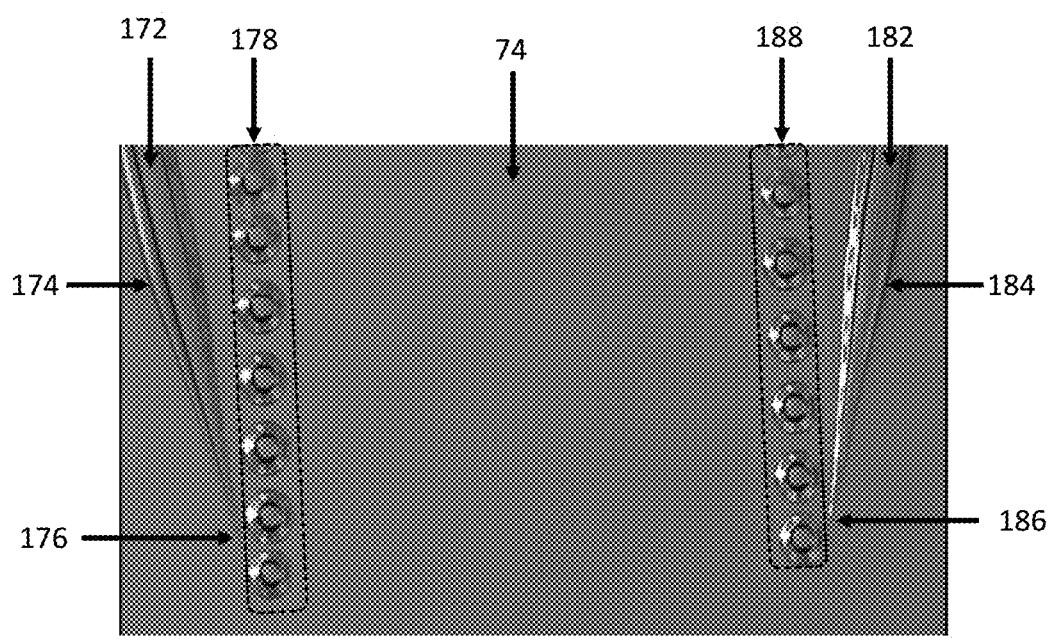
FIG. 11 is a photograph showing the output portions of two glass capillary tubes immersed in a liquid and nitrogen gas bubbles being generated in the liquid from the outlet of the capillary tubes.

The measurement system 70 includes a controller 86 that is coupled to the imaging system 94 and the regulated pneumatic system 78. The imaging system 94 is configured to capture images of the capillary tube 120, particularly the output portion 130 under immersion in the liquid 74. FIG. 11 is a photograph, captured by an imaging system, showing the output portions (174, 184) of two glass capillary tubes (172, 182) immersed in a propylene glycol liquid (74) and nitrogen gas bubbles (178, 188) being generated in the liquid from the respective outlets (176, 186). In the example shown in FIG. 11, the pressure of the nitrogen gas supplied to the respective capillary tubes is sufficient (greater than or equal to MPGBG values of both capillary tubes) that gas bubbles are generated. For each of the respective capillary tubes (172, 182), there is a minimum pressure for gas bubble generation (MPGBG), below which no gas bubbles are generated.

Figure 15:
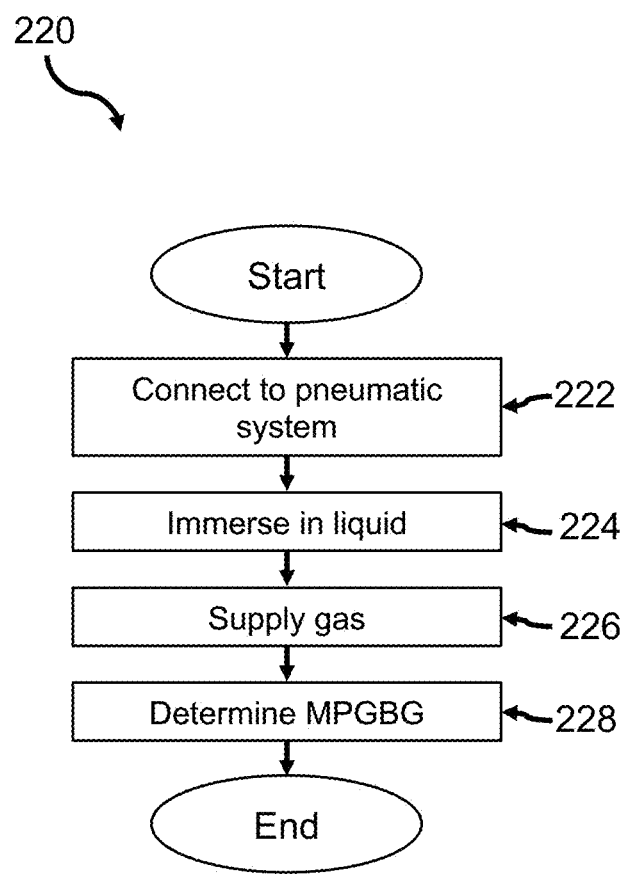
FIG. 15 is a flow diagram of a method of measuring a minimum pressure for gas bubble generation (MPGBG) value of a capillary tube.

A flow diagram of a method of measuring a minimum pressure for gas bubble generation (MPGBG) value of a capillary tube is shown in FIG. 15. At step 222, the inlet 124 of the capillary tube 120 is connected to the regulated pneumatic system 78, which is configured to supply a gas to the inlet under pressure. At step 224, at least an output portion of the capillary tube is immersed in the liquid. When the capillary tube is immersed in the liquid, it is preferable to prevent the liquid from entering into the capillary tube through its outlet and traveling upwards by capillary action (capillary flow). Accordingly, it preferable for the regulated pneumatic system 78 to supply the gas under an initial pressure that is sufficient to prevent this capillary flow. The supplying of the gas under the initial pressure may coincide with the immersing of the capillary tube in the liquid (step 224), and moreover, the supplying of the gas under the initial pressure may begin before immersing the capillary tube in the liquid. At step 226, the gas is supplied to the inlet under a range of pressures, including (1) a higher pressure range and (2) a lower pressure range. In the higher pressure range, gas bubbles are generated in the liquid from the outlet of the capillary tube, and in the lower pressure range, no gas bubbles are generated in the liquid from the outlet of the capillary tube. In the example shown in FIG. 10, the imaging system 94 is configured to capture images of the outlet and any gas bubbles being generated from the outlet at particular times. The controller 86 is configured to: receive images captured by the imaging system 94 and instruct the regulated pneumatic system to supply the gas to the inlet of the capillary tubes under a range of pressures. Based on the images captured by the imaging system, the controller determines the higher pressure range in which gas bubbles are generated in the liquid from the outlet of the capillary tube and the lower pressure range in which no gas bubbles are generated. In some cases, one can presume that the pressure set values instructed by the controller 86 to the regulated pneumatic system 78 accurately reflect the actual pressures at the inlet. In other cases, the optional pressure sensor 80 installed along the gas passageway 88, can measure the pressure of the gas supplied to the inlet 124. The controller 86 can be configured to read the pressure sensor values from the pressure sensor 80.

A concrete example of an implementation of step 226 is as follows. The controller 86 instructs the regulated pneumatic system to supply gas to the inlet at the following pressure set values (mbar): 1100, 1110, 1120, 1130, 1140, 1150, 1160, 1170, 1180, and 1190. As the gas is supplied to the inlet under this range of pressures, the imaging system 94 captures images of the outlet and any gas bubbles being generated from the outlet. The controller 86 determines that gas bubbles are not detected at set pressure values (mbar) of 1100, 1110, 1120, 1130, 1140, 1150, and 1160, and gas bubbles are detected at set pressure values (mbar) of 1170, 1180, and 1190. In this case, the higher pressure range corresponds to 1170 mbar and higher, and the lower pressure range corresponds to 1160 mbar and lower.

At step 228, a value of a minimum pressure for gas bubble generation (MPGBG) of the capillary tube is determined. In the foregoing example, controller can determine that the MPGBG value is a lowest pressure value (1170 mbar) among the higher pressure range (1170 mbar and higher). However, it may be more accurate to assign a value intermediate between a highest pressure value (1160 mbar) among the lower pressure range (1160 mbar and lower) and a lowest pressure value (1170 mbar) among the higher pressure range (1170 mbar and higher) as the MPGBG value. Such an intermediate value can be determined by calculation (e.g., calculating an average of the highest pressure value among the lower pressure range and the lowest pressure value among the higher pressure range) or by repetition of step 226 within a narrower pressure range (e.g., supplying the gas to the inlet under a range of pressures between the highest pressure value among the lower pressure range and the lowest pressure value among the higher pressure range).

At step 226, the regulated pneumatic system could sequentially increase the pressure (e.g., from 1100 mbar to 1190 mbar) or sequentially decrease the pressure (e.g., from 1190 mbar to 1100 mbar). We have observed slight differences in measured MPGBG values between MPGBG measurements conducted under sequentially increasing pressures and sequentially decreasing pressures, suggesting that there is a hysteresis or some other measurement-related effect. Such effects can be reduced by calculating an average of the MPGBG values measured under sequentially increasing pressures and sequentially decreasing pressures and determining the average to be the MPGBG value.

While it is possible to measure the output diameter of a capillary tube using a scanning electron microscope (SEM), SEM measurements are time-consuming and expensive. On the other hand, MPGBG measurements can be carried out more quickly. In accordance with one aspect of the present invention, a numerical model correlating estimated capillary tube output diameter values to measured minimum pressure for gas bubble generation (MPGBG) values is obtained, based on measurements of capillary tube output diameter values and MPGBG values of capillary tubes in a reference group. The numerical model can be configured to have one of the following: (1) estimated capillary tube output diameter values as outputs and MPGBG values as inputs; and (2) estimated capillary tube output diameter values as inputs and MPGBG values as outputs. After the numerical model has been calculated, it is possible to estimate an output diameter value of a capillary tube without actually measuring the output diameter value using an SEM. Instead, the MPGBG value of the capillary tube is measured and the measured MPGBG value is input into the numerical model to estimate the capillary tube output diameter value.

Figure 12:
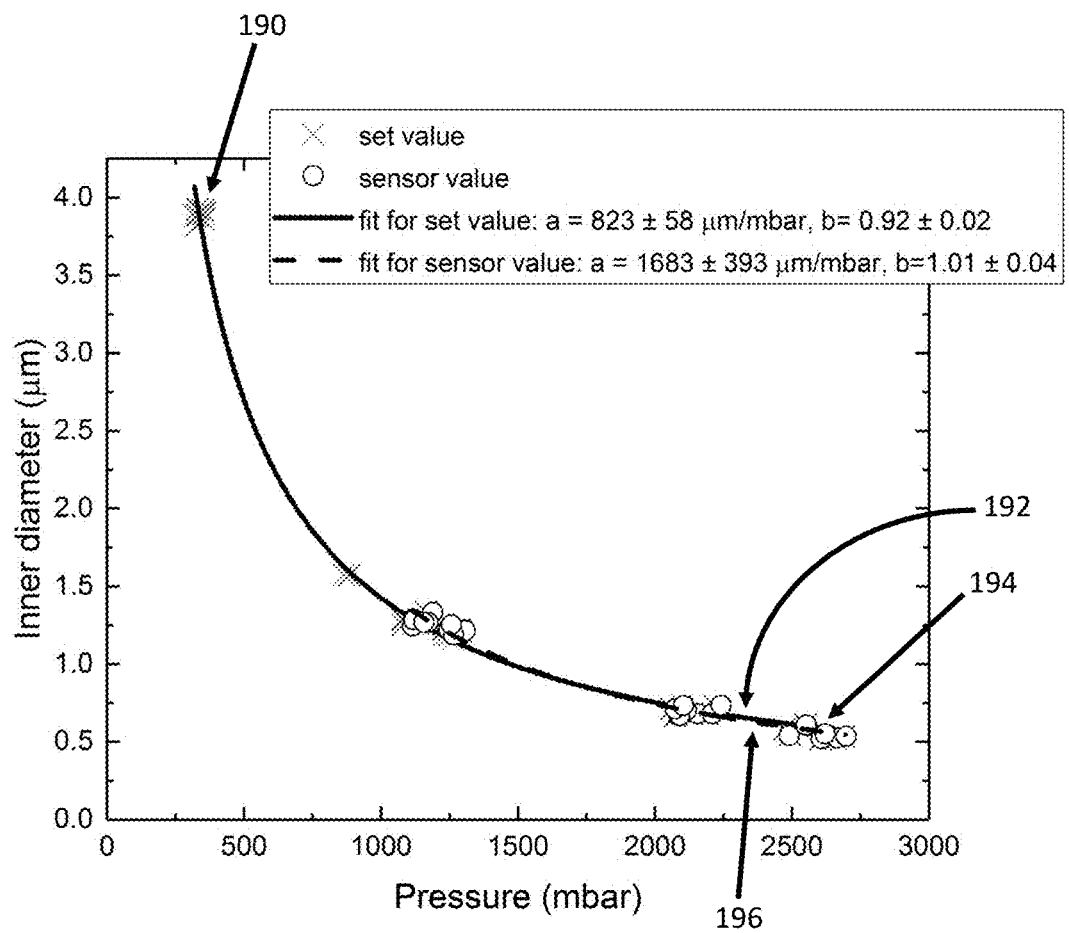
FIG. 12 is a graph showing the dependence of the output diameter of capillary tubes as a function of their MPGBG values.
Figure 16:
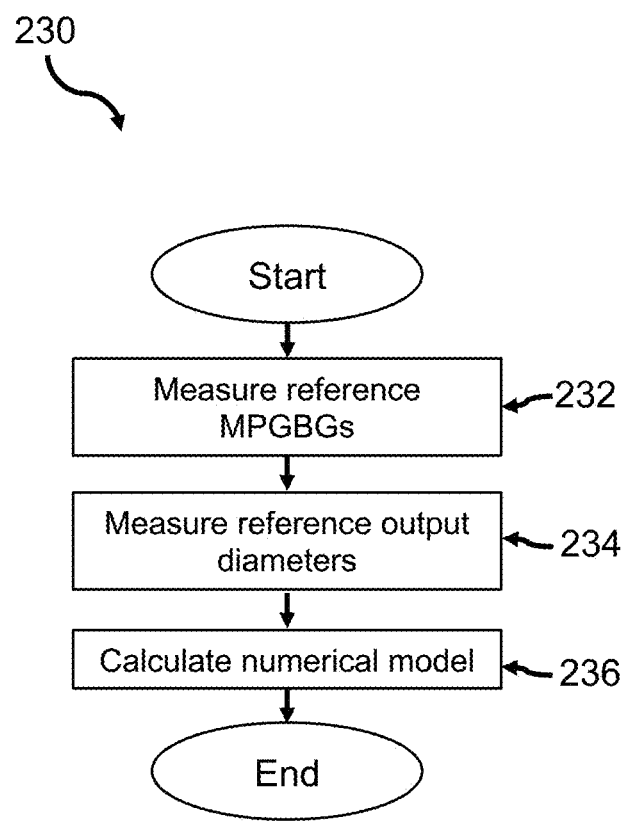
FIG. 16 is a flow diagram of a method of obtaining a numerical model relating estimated capillary tube output diameter values to minimum pressure for gas bubble generation (MPGBG) values.

A flow diagram of a method 230 of obtaining a numerical model correlating estimated capillary tube output diameter values to minimum pressure for gas bubble generation (MPGBG) values for a liquid is shown in FIG. 16. At step 232, MPGBG values are measured for a plurality of capillary tubes in a reference group. A reference group of capillary tubes is used to calculate the desired numerical model. A reference group is sufficiently large that it represents the variation in output diameters of a population of capillary tubes, but is sufficiently small that it is feasible, for each of the capillary tubes in the reference group, to conduct SEM measurements of the respective output diameter. For each capillary tube in the reference group, step 232 corresponds to the steps recited in method 220 (FIG. 15). At step 234, an output diameter of each of the plurality of capillary tubes in the reference group is measured by a microscope apparatus, such as an SEM. A graph of the data measured at steps 232 and 234 is shown in FIG. 12. FIG. 12 is a graph 190 showing the dependence of the output diameter (inner diameter) of capillary tubes in a reference group as a function of their MPGBG values. In this case, the reference group consisted of 41 capillary tubes.

At step 236, a numerical model is calculated from the measured output diameter values and the measured MPGBG values of each of the plurality of capillary tubes in the reference group. The numerical model can be calculated by least squares curve fitting. This numerical model has estimated capillary tube output diameter values as outputs and MPGBG values as inputs. In the example shown in FIG. 12, the numerical model is expressed as an equation: $P=ax^{-b}$, where P is MPGBG expressed in mbar, x is output diameter expressed in μm, and a and b are numerical constants. The MPGBG values can be expressed as pressure set values (190, shown as x's in FIG. 12) and as pressure sensor values (194, shown as circles in FIG. 12). The pressure set values are instructed by the controller 86 to the regulated pneumatic system 78, and pressure sensor values are measured at the optional pressure sensor 80. In the example shown in FIG. 12, some of the MPGBG measurements included both pressure set values and pressure sensor values, while some other of the MPGBG measurements only have pressure set values. The respective pressure set values and the respective pressure sensor values differed little from each other. MPGBG values were in a range of approximately 0.3 bar to 2.6 bar, and capillary tube output diameters were in a range of approximately 0.5 μm to 4.0 μm. Results of the least-squares curve fitting for the numerical model $P=ax^{-b}$ are as follows. For MPGBG values expressed as pressure set values, a=823 □ 58 μm/mbar and b=0.92 □ 0.02. The resulting numerical model is shown as line 192 in FIG. 12. For MPGBG values expressed as pressure sensor values, a=1683 □ 393 μm/mbar and b=1.01 □ 0.04. The resulting numerical model is shown as dashed line 196 in FIG. 12.

Figure 17:
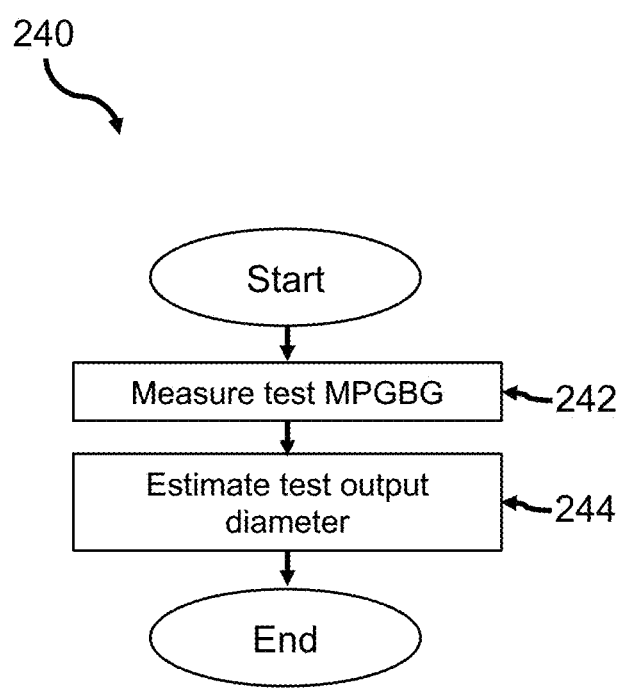
FIG. 17 is a flow diagram of a method of estimating an output diameter of a capillary tube in a test group.

A flow diagram of a method 240 of estimating an output diameter of a test capillary tube is shown in FIG. 17. A test group of capillary tubes contains the capillary tubes subject to MPGBG measurements. A capillary tube in a test group is sometimes referred to as a test capillary tube or simply as a capillary tube when the context is clear. At step 242, an MPGBG value of a capillary tube in a test group (test capillary tube) is measured. Step 242 corresponds to the steps recited in method 220 (FIG. 15). At step 244, the MPGBG value of the test capillary tube is input into the numerical model having estimated capillary tube output diameter values as outputs and MPGBG values as inputs to estimate the output diameter value of the test capillary tube.

Figure 18:
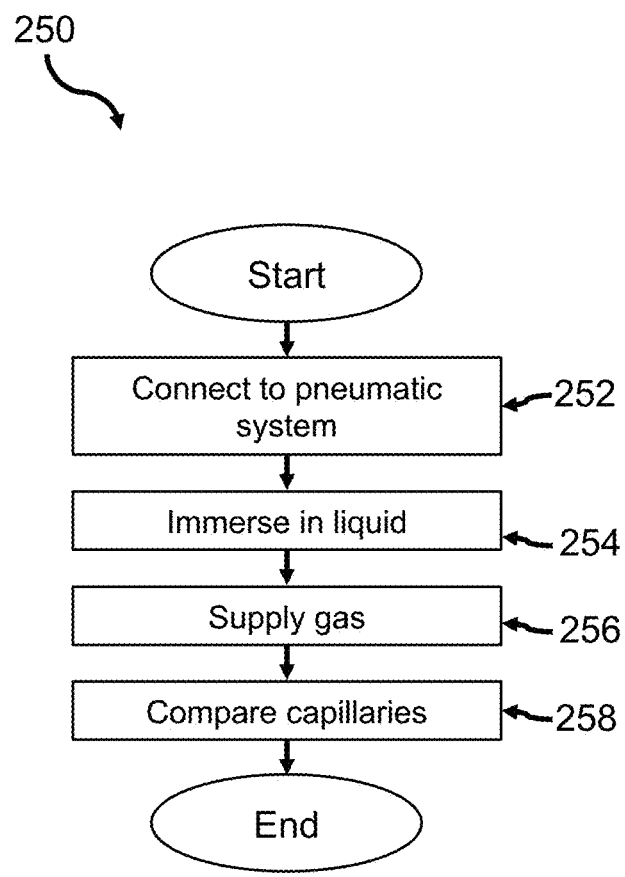
FIG. 18 is a flow diagram of a method of comparing a first capillary tube and a second capillary tube.

A flow diagram of a method 250 of comparing a first capillary tube and a second capillary tube is shown in FIG. 18. Specifically, relative MPGBG values of the first and second capillaries are compared. By use of a suitable numerical model, the first and second capillaries can be compared for another characteristic, such as output diameter (FIG. 12). An apparatus similar to measurement apparatus 70 (FIG. 10) is used, except that a capillary holder is configured to support a first capillary tube and a second capillary tube. At step 252 (analogous to step 222 of FIG. 15), the inlets of the first capillary tube and the second capillary tube are connected to the regulated pneumatic system, which is configured to supply a gas to the inlets under pressure. At step 254 (analogous to step 224 of FIG.

15), at least a respective output portion of the first capillary tube and of the second capillary tube is immersed in the liquid. In the example shown in FIG. 11, at least a respective output portion (174, 184) of a first glass capillary tube (172) and of a second glass capillary tube (182) are shown immersed in a propylene glycol liquid (74). At step 256 (analogous to step 226 of FIG. 15), the gas is supplied to the inlets under a range of pressures, including (1) a higher pressure range, and (2) a lower pressure range. In the higher pressure range, gas bubbles are generated in the liquid from an outlet of the first capillary tube and an outlet of the second capillary tube. In the example shown in FIG. 11, the gas being supplied to the inlets is in the higher pressure range. In the lower pressure range, no gas bubbles are generated in the liquid from the outlets. At step 256, it may also be possible to find an intermediate pressure range between the higher pressure range and the lower pressure range in which gas bubbles are generated in the liquid from one of the outlets. For example, in the intermediate pressure range, gas bubbles are generated from the outlet of the first capillary tube and no gas bubbles are generated from the outlet of the second capillary tube. Hence, the first capillary tube would have an MPGBG value that is lower than the second capillary tube. Accordingly, at step 258, one of the following is determined: (1) one of the first capillary tube and the second capillary tube has a higher MPGBG value than another of the first capillary tube, or (2) the first capillary tube and the second capillary tube have MPGBG values that are indistinguishable from each other. In the foregoing example, the second capillary tube has a higher MPGBG value than the first capillary tube. If no intermediate pressure range can be found, one can determine that the first capillary tube and the second capillary tube have MPGBG values that are indistinguishable from each other.

Figure 19:
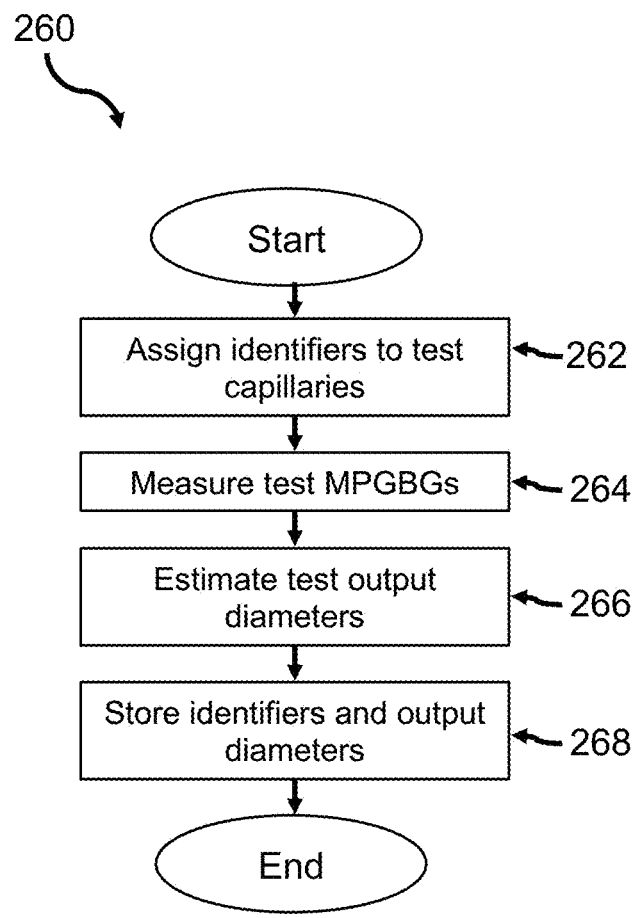
FIG. 19 is a flow diagram of a method of estimating and storing output diameter values of capillary tubes in a test group.

A flow diagram of a method 260 of estimating and storing output diameter data of capillary tubes in a test group is shown in FIG. 19. At step 262, an identifier is assigned to each of the capillary tubes in the test group (test capillary tubes). For example, an identifier may be imprinted on each handle 122 of the test capillary tubes. For example, each test capillary tube can be stored in a separate compartment having a respective identifier. At step 264, an MPGBG value is measured for each test capillary tube. For each test capillary tube, step 264 corresponds to step 242 (FIG. 17). At step 266, the MPGBG value of each test capillary tube is input into the numerical model to estimate the output diameter value of the respective test capillary tube. For each test capillary tube, step 266 corresponds to step 244 (FIG. 17). At step 268, for each test capillary tube, the respective identifier and the respective estimated output diameter value associated with the identifier is stored in a record in a data store, such as a spreadsheet or a database, which can be saved on a computer hard drive. These stored data can be retrieved and used at a later time.

Figure 20:
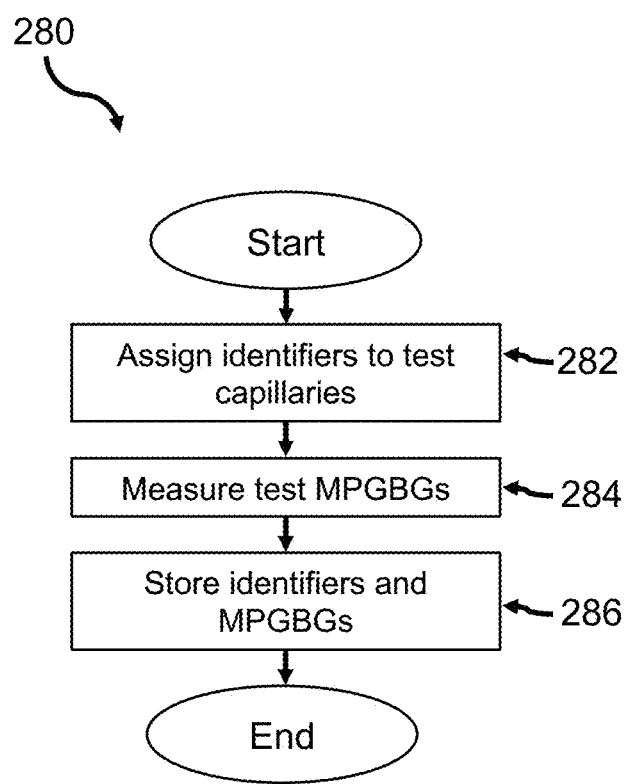
FIG. 20 is a flow diagram of a method of measuring and storing minimum pressure for gas bubble generation (MPGBG) values of capillary tubes in a test group.

A flow diagram of a method 280 of measuring and storing minimum pressure for gas bubble generation (MPGBG) values of capillary tubes in a test group is shown in FIG. 20. At step 282, an identifier is assigned to each of the capillary tubes in the test group (test capillary tubes). Step 282 corresponds to step 262 (FIG. 19). At step 284, an MPGBG value is measured for each test capillary tube. Step 284 corresponds to step 264 (FIG. 19). At step 286, for each test capillary tube, the respective identifier and the respective MPGBG value associated with the respective identifier is stored in a data store, such as a spreadsheet or a database, which can be saved on a computer hard drive. These stored data can be retrieved and used at a later time.

Figure 21:
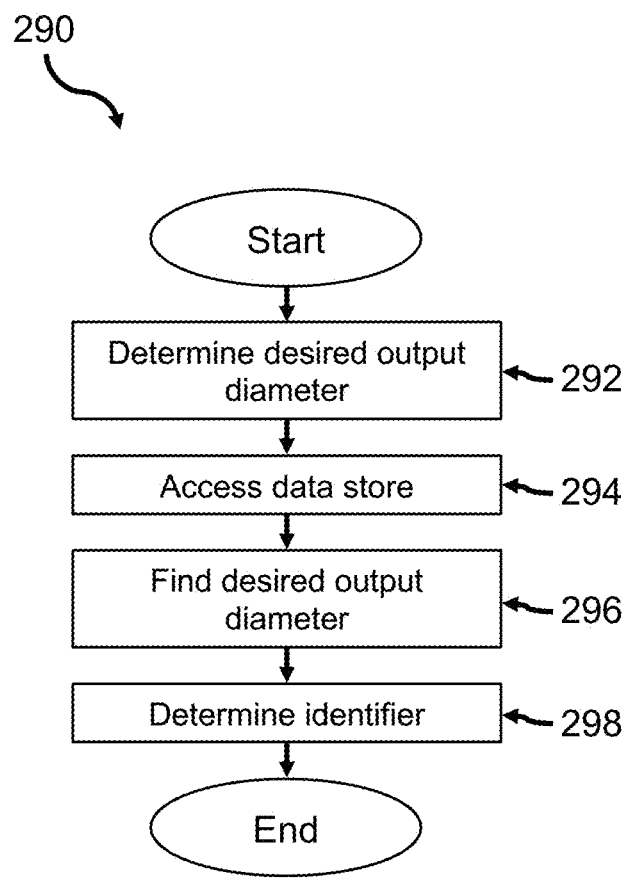
FIG. 21 is a flow diagram of a method of selecting at least one capillary tube from a plurality of capillary tubes in a test group, based on output diameter values in a data store.

A flow diagram of a method 290 of selecting at least one capillary tube from a plurality of capillary tubes in a test group, based on output diameter values in a data store, is shown in FIG. 21. The method 290 can be used when a data store already contains an estimated output diameter value and an identifier for each of the capillary tubes in the test group. At step 292, a range of desired output diameter values for the at least one capillary tube is determined. The desired output diameter values should be chosen to be within a range of possible output diameter values of the capillary tubes in the test group. At step 294, the data store containing an estimated output diameter value and an identifier for each of the capillary tubes in the test group is accessed. At step 296, at least one estimated output diameter value within the range is found by searching in the data store. At step 298, the identifier associated with the at least one estimated output diameter value (found at step 296) is determined from searching in the data store.

Figure 22:
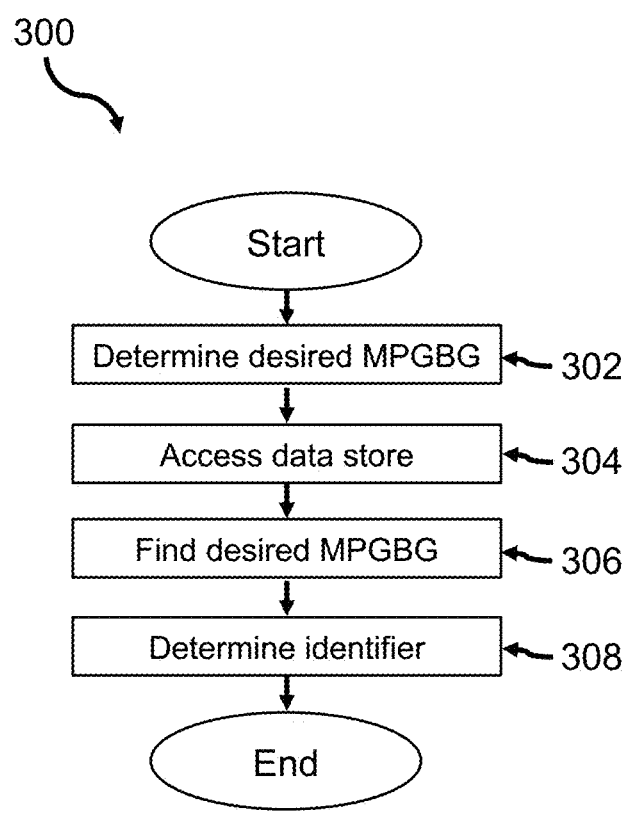
FIG. 22 is a flow diagram of a method of selecting at least one capillary tube from a plurality of capillary tubes in a test group, based on MPGBG values in a data store.

A flow diagram of a method 300 of selecting at least one capillary tube from a plurality of capillary tubes in a test group, based on MPGBG values in a data store, is shown in FIG. 22. The method 300 can be used when a data store already contains an MPGBG value and an identifier for each of the capillary tubes in the test group. At step 302, a range of desired MPGBG values of the at least one capillary tube is determined. The desired MPGBG values should be chosen to be within a range of possible MPGBG values of the capillary tubes in the test group. At step 304, the data store containing an MPGBG value and an identifier for each of the capillary tubes in the test group is accessed. At step 306, at least one MPGBG value within the range is found by searching in the data store. At step 308, the identifier associated with the at least one MPGBG value (found at step 306) is determined from searching in the data store.

Figure 23:
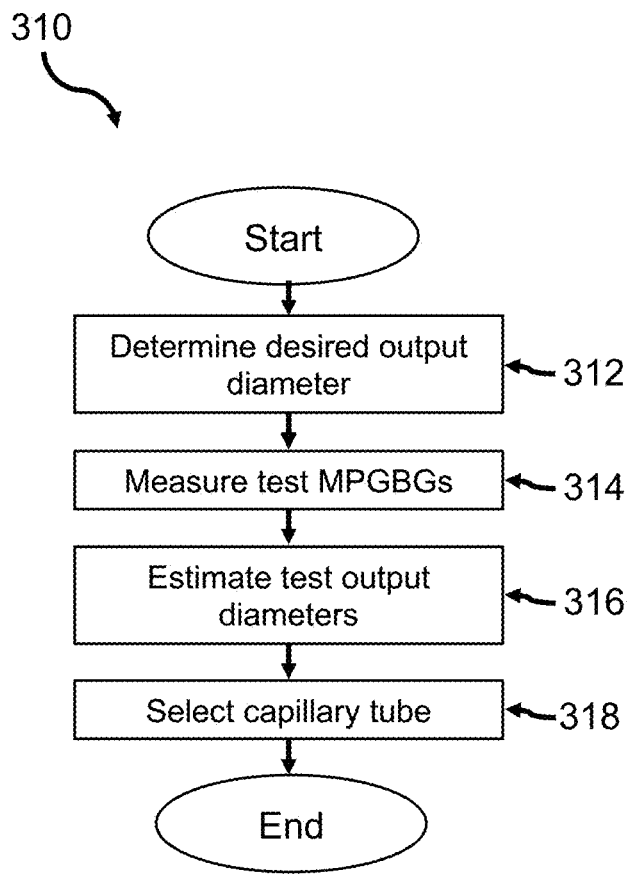
FIG. 23 is a flow diagram of another method of selecting at least one capillary tube from a plurality of capillary tubes in a test group, based on estimated output diameter values.

A flow diagram of a method 310 of selecting at least one capillary tube from a plurality of capillary tubes in a test group, based on estimated output diameter values, is shown in FIG. 23. At step 312, a range of desired output diameter values of the at least one capillary tube is determined. The desired output diameter values should be chosen to be within a range of possible output diameter values of the capillary tubes in the test group. At step 314, an MPGBG value is measured for at least one of the test capillary tubes. Step 314 corresponds to step 242 (FIG. 17). At step 316, the MPGBG value of the at least one test capillary tube (from step 314) is input into the numerical model to estimate the output diameter value of the respective test capillary tube. Step 316 corresponds to step 244 (FIG. 17). At step 318, the at least one test capillary tube (from step 316) is selected if the estimated output diameter is within the range. Steps 314, 316, and 318 are repeated until a test capillary tube having an estimated output diameter within the range has been selected.

Figure 24:
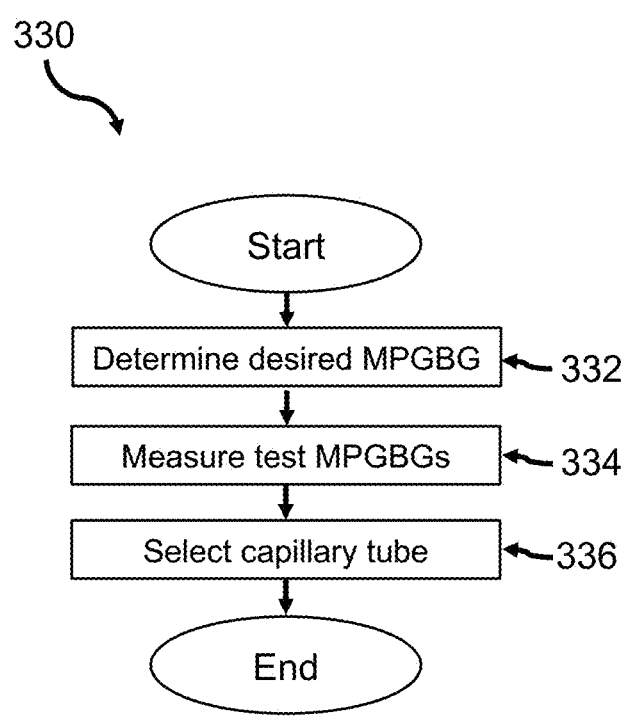
FIG. 24 is a flow diagram of another method of selecting at least one capillary tube from a plurality of capillary tubes in a test group, based on measured MPGBG values.

A flow diagram of a method 330 of selecting at least one capillary tube from a plurality of capillary tubes in a test group, based on measured MPGBG values, is shown in FIG. 24. At step 332, a range of desired MPGBG values of the at least one capillary tube is determined. The desired MPGBG values should be chosen to be within a range of possible MPGBG values of the capillary tubes in the test group. At step 334, an MPGBG value is measured for at least one of the test capillary tubes. Step 334 corresponds to step 242 (FIG. 17). At step 336, the at least one test capillary tube (from step 334) is selected if the MPGBG value is within the range. Steps 334 and 336 are repeated until a test capillary tube having an MPGBG value within the range has been selected.

Figure 13:
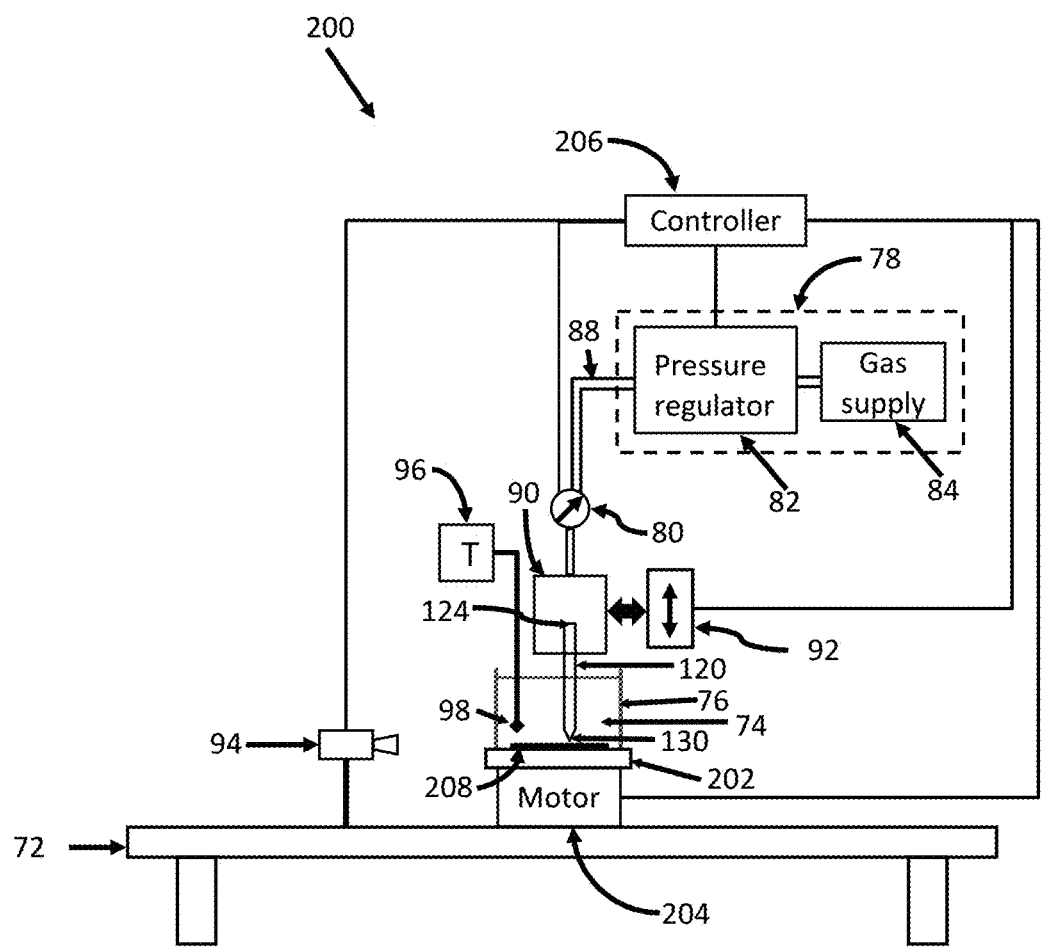
FIG. 13 is a schematic view of an illustrative capillary tube cutting apparatus.

An illustrative capillary tube cutting apparatus according to the present invention is shown in schematic view in FIG. 13. The capillary tube cutting apparatus 200 includes a substrate stage 72, a liquid container 76 containing a liquid 74, an imaging system 94, a temperature sensor assembly 96, a capillary tube holder 90 supporting a capillary tube 120, a vertical positioner 92, a pressure sensor 80, a regulated pneumatic system 78, and a controller 206. At least an output portion 130 of the capillary tube 120 is immersed in the liquid. In the example shown, some of the elongate input portion 128 is also immersed in the liquid. The capillary tube holder 90 is attached to or otherwise mechanically coupled to the vertical positioner 92. Accordingly, the vertical positioner 92 controls the vertical position of the capillary tube 120. The selection of liquid 74 has been discussed with reference to the measurement apparatus of FIG. 10. In the example shown, the capillary tube 120 is a glass capillary tube. However, other capillary tubes can also be used including stainless steel capillary tubes and plastic capillary tubes.

The configuration of the temperature sensor assembly 96, the regulated pneumatic system 78, and the optional pressure sensor 80, is identical to that shown in FIG. 10. In the example shown, the liquid container 76 is attached to a rotatable stage 202 which is actuated by a rotatable stage motor 204. An abrasive material 208 is immersed in the liquid 74 and attached to the bottom of the liquid container 76. The abrasive material 208 is not particularly limited as long as it is suitable for abrading the capillary tube. For glass capillary tubes, we have found that indium tin oxide (ITO) coated glass substrates can be used as an abrasive material for abrading the output portions. Other abrasive materials can also be used. In operation, the vertical positioner 92 lowers the capillary tube 120 toward the abrasive material 208 while the rotatable stage 202, liquid container 76, and the abrasive material rotate under actuation of the rotatable stage motor 204. Accordingly, the outlet of the capillary tube is abraded against the abrasive material.

In the example shown, the capillary tube cutting apparatus 200 includes a controller 206 that is coupled to the imaging system 94, the regulated pneumatic system 78, the vertical positioner 92, the rotatable stage motor 204, and the pressure sensor 90. The imaging system 94 is configured to capture images of the output portion 130 under immersion in the liquid 74. The controller 206 can control the abrasion of the capillary tube outlet by controlling the actuation of the rotatable stage motor 204 and the vertical positioner 92. In the example shown, the abrasive material is rotated with respect to the outlet of the capillary tube while the outlet is pressed against the abrasive material. There are other suitable ways of abrading the capillary tube in the liquid. The vertical positioner 92 is configured to adjust the vertical position of the capillary tube. The vertical positioner 92 is capable of immersing at least the output portion of the capillary tube in the liquid and bringing the outlet into contact with the abrasive material 208 immersed in the liquid. Additionally, the controller 206 can configure the regulated pneumatic system to supply the gas to the inlet under a desired pressure. As the abrasion of the capillary tube outlet proceeds and the output diameter is increased, the corresponding MPGBG decreases. If the abrasion of the capillary tube outlet proceeds under constant pressure applied at the capillary tube inlet, said pressure may be above the MPGBG at a first time $T_1$ and may be below MPGBG at a second time $T_2$ after $T_1$. In other words, gas bubbles may start to be generated in the liquid from the outlet at a time between $T_1$ and $T_2$. The capillary tube cutting apparatus 200 can be used to cut a capillary tube to attain a desired MPGBG value for a liquid (FIG. 24) or attain a desired estimated outlet diameter value (FIG. 25).

Figure 25:
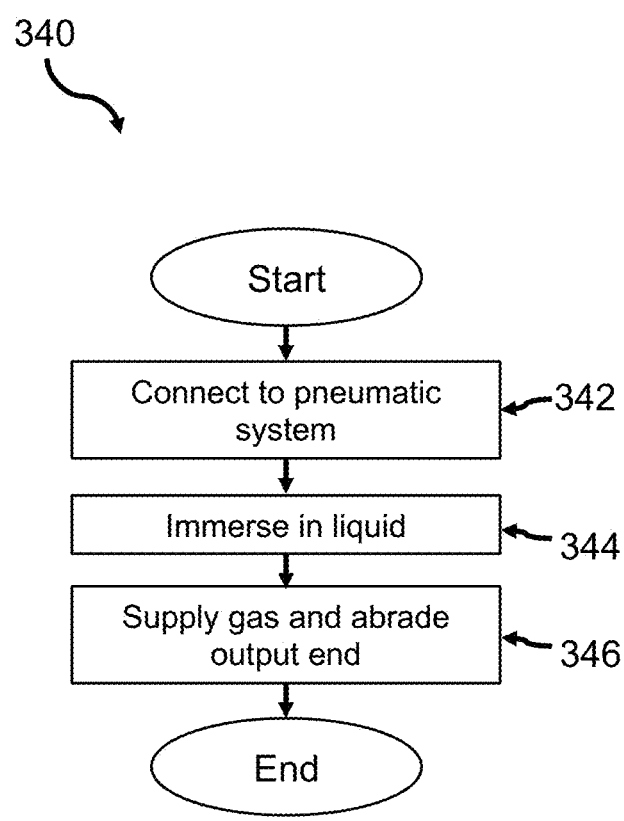
FIG. 25 is a flow diagram of a method of cutting a capillary tube to a desired MPGBG value.

A flow diagram of a method 340 of cutting (abrading) a capillary tube to a desired MPGBG value for a liquid is shown in FIG. 25. At step 342, the inlet 124 of the capillary tube 120 is connected to the regulated pneumatic system 78, which is configured to supply a gas to the inlet under pressure. At step 344, at least an output portion of the capillary tube is immersed in the liquid. When the capillary tube is immersed in the liquid, it is preferable to prevent the liquid from entering into the capillary tube through its outlet and traveling upwards by capillary action (capillary flow). Accordingly, it preferable for the regulated pneumatic system 78 to supply the gas under an initial pressure that is sufficient to prevent this capillary flow. The supplying of gas under the initial pressure may coincide with the immersing of the capillary tube in the liquid (step 344), and moreover, the supplying of the gas under the initial pressure may begin before immersing the capillary tube in the liquid. At step 346, the following are carried out concurrently: (1) the gas is supplied to the inlet under a pressure corresponding to the desired MPGBG value; and (2) the outlet is abraded against the abrasive material. In the example shown in FIG. 13, the imaging system 94 is configured to capture images of the outlet and any gas bubbles being generated from the outlet. Step 346 continues until gas bubbles are generated in the liquid from the outlet. For example, if the images captured by the imaging system 94 show that gas bubbles are being generated in the liquid from the outlet, the controller 206 stops the abrading, by instructing the motor 204 to stop rotation and/or instructing the vertical positioner 92 to lift the capillary tube away from the abrasive material 208. Based on the images captured by the imaging system 94, the controller 206 determines the higher pressure range in which gas bubbles are generated in the liquid 74 from the outlet 130 of the capillary tube and the lower pressure range in which no gas bubbles are generated. In some cases, one can presume that the pressure set values instructed by the controller 86 to the regulated pneumatic system 78 accurately reflect the actual pressures at the inlet. In other cases, the optional pressure sensor 80 installed along the gas passageway 88, can measure the pressure of the gas supplied to the inlet 124. The controller 86 can be configured to read the pressure sensor values from the pressure sensor 80.

At the end of step 346, the capillary tube should have been cut to the desired MPGBG value. It may be preferable to conduct another measurement to confirm this. Optional steps are outlined below. Upon conclusion of step 346, the vertical positioner 92 lifts the capillary tube 120 away from the abrasive material and the rotation of the rotatable stage motor 204 is stopped. Steps 226 and 228 of method 220 (FIG. 15) are carried out to measure the MPGBG value of the capillary tube that has been cut.

Figure 14:
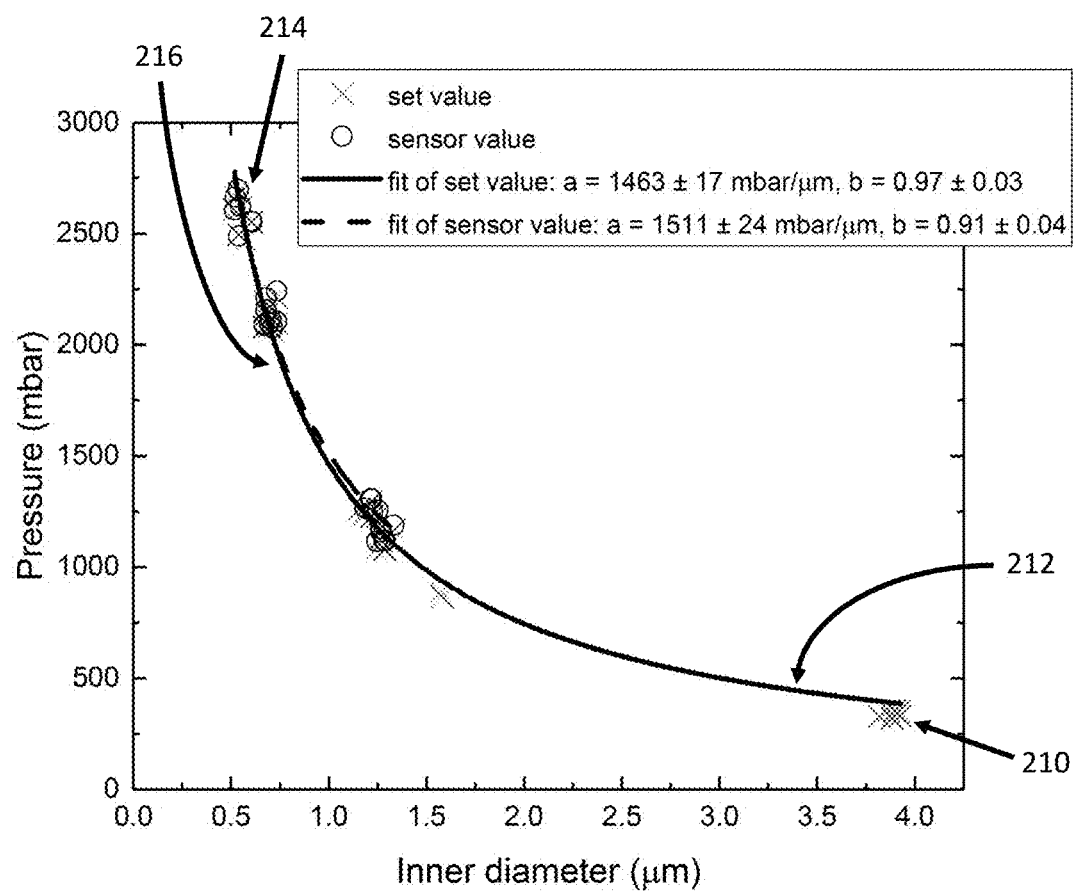
FIG. 14 is a graph showing the dependence of the minimum pressure for gas bubble generation (MPGBG) values of capillary tubes as a function of their output diameters.
Figure 26:
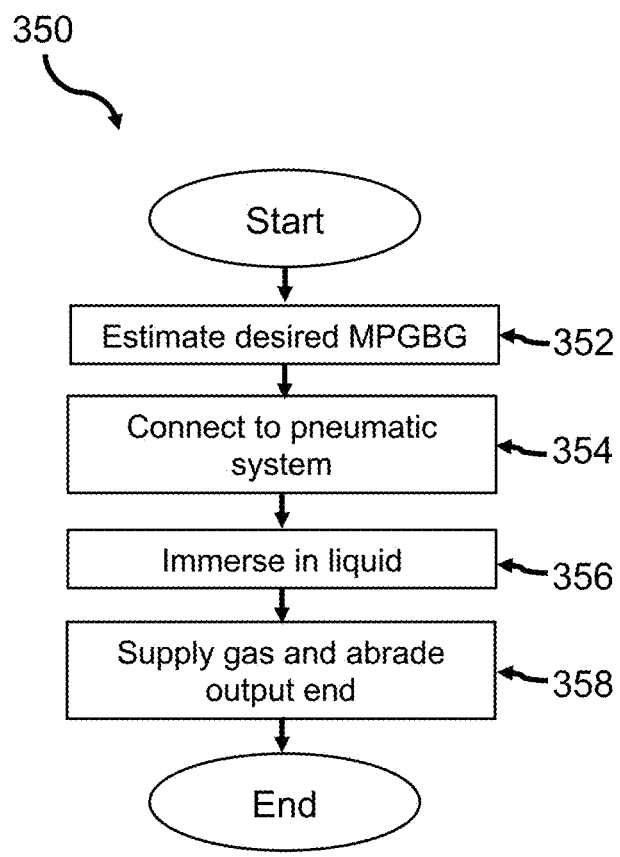
FIG. 26 is a flow diagram of a method of cutting a capillary tube to an estimated capillary tube output diameter value.

A flow diagram of a method 350 of cutting (abrading) a capillary tube to an estimated capillary tube outlet diameter value is shown in FIG. 26. Here the numerical model used has estimated capillary tube output diameter (inner diameter) values as inputs and MPGBG values as outputs. The measured values shown in FIG. 14 are identical to those shown in FIG. 12 but the horizontal and vertical axes are switched. In the example shown in FIG. 14, the numerical model is expressed as an equation: $x=aP^{-b}$, where P is MPGBG expressed in mbar, x is output diameter expressed in µm, and a and b are numerical constants. The MPGBG values can be expressed as pressure set values (210, shown as x's in FIG. 14) and as pressure sensor values (214, shown as circles in FIG. 14). Results of the least-squares curve fitting for the numerical model $x=aP^{-b}$ are as follows. For MPGBG values expressed as pressure set values, $a=1463 \pm 17$ mbar/µm and $b=0.97 \pm 0.03$. The resulting numerical model is shown as line 212 in FIG. 14. For MPGBG values expressed as pressure sensor values, $a=1511 \pm 24$ mbar/µm and $b=0.91 \pm 0.04$. The resulting numerical model is shown as dashed line 216 in FIG. 14.

At step 352, the desired capillary tube output diameter value is input into the numerical model to estimate the desired MPGBG value. Steps 354, 356, and 358 correspond to steps 342, 344, and 346 of FIG. 25, respectively. Step 358 continues until gas bubbles are generated in the liquid from the outlet.

At the end of step 358, the capillary tube should have been cut to the desired MPGBG value corresponding to the desired capillary tube output diameter value. It may be preferable to conduct another measurement to confirm this. Optional steps are outlined below. Upon conclusion of step 358, the vertical positioner 92 lifts the capillary tube 120 away from the abrasive material and the rotation of the rotatable stage motor 204 is stopped. Steps 226 and 228 of method 220 (FIG. 15) are carried out to measure the MPGBG value of the capillary tube that has been cut.

The invention claimed is:

1. A method of measuring a minimum pressure for gas bubble generation (MPGBG) value of a capillary tube for a liquid, comprising the steps of:
   connecting an inlet of the capillary tube to a regulated pneumatic system, configured to supply a gas to the inlet under pressure;
   immersing at least an output portion of the capillary tube in the liquid;
   supplying the gas to the inlet under a range of pressures, including: (1) a higher pressure range in which gas bubbles are generated in the liquid from an outlet of the capillary tube, and (2) a lower pressure range in which no gas bubbles are generated in the liquid from the outlet of the capillary tube; and
   determining a value of a minimum pressure for gas bubble generation (MPGBG) of the capillary tube for the liquid.

2. The method of claim 1, wherein the determining comprises assigning a value intermediate a highest pressure value among the lower pressure range and a lowest pressure value among the higher pressure range as the MPGBG value.

3. The method of claim 1, wherein the step of supplying the gas comprises monitoring the pressure using a pressure sensor.

4. The method of claim 1, wherein the capillary tube is selected from the group consisting of: a glass capillary tube, a stainless steel capillary tube, and a plastic capillary tube.

5. The method of claim 1, wherein the liquid is selected from the group consisting of: propylene glycol, ethylene glycol, diethylene glycol monobutyl ether, 2-methoxyethanol, silicone oil, purified water, and glycerol.

6. The method of claim 1, wherein the step of supplying the gas comprises monitoring a temperature of the liquid.

7. The method of claim 1, wherein the gas is selected from the group consisting of: nitrogen, carbon dioxide, and any of the noble gases.

8. The method of claim 1, wherein the step of immersing additionally comprises supplying the gas to the inlet under an initial pressure sufficient to prevent capillary flow of the liquid into the capillary tube.

\* \* \* \* \*